(12) United States Patent
Ogo (10) Patent No.: US 11,137,623 B2
(45) Date of Patent: Oct. 5, 2021

(54) SPECTACLE LENS AND SPECTACLES

(71) Applicant: HOYA LENS THAILAND LTD., Pathumthani (TH)

(72) Inventor: Yoichi Ogo, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 356 days.

(21) Appl. No.: 16/365,004

(22) Filed: Mar. 26, 2019

(65) Prior Publication Data

US 2019/0219843 A1  Jul. 18, 2019

Related U.S. Application Data

(63) Continuation of application No. PCT/JP2018/036302, filed on Sep. 28, 2018.

(30) Foreign Application Priority Data

Sep. 29, 2017 (JP) .............................. JP2017-191687

(51) Int. Cl.
*G02C 7/08* (2006.01)
*G02B 5/28* (2006.01)
(Continued)

(52) U.S. Cl.
CPC ............. *G02C 7/088* (2013.01); *G02B 1/041* (2013.01); *G02B 1/115* (2013.01); *G02B 5/22* (2013.01);
(Continued)

(58) Field of Classification Search
CPC .......... G02C 7/088; G02C 7/10; G02B 1/041; G02B 1/115; G02B 5/22; G02B 5/28; G02B 5/285
(Continued)

(56) References Cited

U.S. PATENT DOCUMENTS

2007/0055369 A1* 3/2007 Grubbs ...................... A61F 2/16
623/6.6
2007/0216861 A1* 9/2007 Ishak ........................ G02C 7/10
351/159.24
(Continued)

FOREIGN PATENT DOCUMENTS

CN 105353528 A 2/2016
CN 105723274 A 6/2016
(Continued)

OTHER PUBLICATIONS

Oct. 29, 2020 Office Action issued in Chinese Patent Application No. 201880003676.2.
(Continued)

*Primary Examiner* — Collin X Beatty
(74) *Attorney, Agent, or Firm* — Oliff PLC (57) ABSTRACT

The spectacle lens includes a lens substrate including a blue light absorbing compound, and a multilayer film including a metal layer having a film thickness of 1.0 nm to 10.0 nm, wherein a blue light cut ratio is 21.0% or more, an average reflectance in a wavelength range of 400 nm to 500 nm measured on an object-side surface is 1.00% or less, and an average reflectance in a wavelength range of 400 nm to 500 nm measured on an eyeball-side surface is 1.00% or less.

8 Claims, 2 Drawing Sheets

(51) Int. Cl.
*G02B 1/115* (2015.01)
*G02B 1/04* (2006.01)
*G02C 7/10* (2006.01)
*G02B 5/22* (2006.01)

(52) U.S. Cl.
CPC .............. *G02B 5/28* (2013.01); *G02B 5/285* (2013.01); *G02C 7/10* (2013.01)

(58) Field of Classification Search
USPC ........................................................ 351/158
See application file for complete search history.

(56) References Cited

U.S. PATENT DOCUMENTS

| | | | | |
|---|---|---|---|---|
| 2008/0291394 | A1* | 11/2008 | Ishak | G02C 7/104 351/159.6 |
| 2015/0146166 | A1* | 5/2015 | Weber | G02C 7/107 351/159.62 |
| 2015/0198821 | A1* | 7/2015 | Miyamoto | G02B 5/0816 351/159.62 |
| 2015/0234208 | A1* | 8/2015 | De Ayguavives | G02B 5/26 351/159.62 |
| 2016/0306190 | A1 | 10/2016 | Takahashi | |
| 2016/0349537 | A1* | 12/2016 | Wu | C23C 14/021 |
| 2017/0097521 | A1* | 4/2017 | Yoshida | G02B 1/11 |
| 2018/0095202 | A1* | 4/2018 | Schmeder | G01J 3/51 |
| 2018/0239171 | A1* | 8/2018 | Wold | G02C 7/105 |

FOREIGN PATENT DOCUMENTS

| | | |
|---|---|---|
| CN | 106104312 A | 11/2016 |
| CN | 107003545 A | 8/2017 |
| EP | 1174734 A2 | 1/2002 |
| EP | 1557698 A2 | 7/2005 |
| EP | 1967891 A1 | 9/2008 |
| EP | 2887129 A1 | 6/2015 |
| EP | 2902817 A1 | 8/2015 |
| JP | 2013-8052 A | 1/2013 |
| WO | 2014/050930 A1 | 4/2014 |
| WO | 2015/046540 A1 | 4/2015 |
| WO | 2015/122278 A1 | 8/2015 |
| WO | 2015/137282 A1 | 9/2015 |
| WO | 2016/060257 A1 | 4/2016 |
| WO | 2016/088763 A1 | 6/2016 |

OTHER PUBLICATIONS

Jan. 8, 2019 International Search Report issued in International Patent Application No. PCT/JP2018/036302.
Mar. 31, 2020 International Preliminary Report on Patentability issued in International Patent Application No. PCT/JP2018/036302.
Feb. 21, 2020 Office Action issued in Chinese Patent Application No. 201880003676.2.
Apr. 3, 2020 Extended European Search Report issued in European Patent Application No. 18857402.4.
May 17, 2021 Office Action issued in Chinese Patent Application No. 201880003676.2.

* cited by examiner

SPECTACLE LENS AND SPECTACLES

CROSS-REFERENCE TO RELATED APPLICATIONS

This application is a Continuation of PCT International Application No. PCT/JP2018/036302 filed on Feb. 28, 2018, which was published under PCT Article 21(2) in Japanese and claims priority under 35 U.S.C § 119(a) to Japanese Patent Application No. 2017-191687 filed on Sep. 29, 2017. The above applications are hereby expressly incorporated by reference, in their entirety, into the present application.

TECHNICAL FIELD

The present disclosure relates to a spectacle lens and spectacles provided with the spectacle lens.

BACKGROUND ART

In recent years, CRT monitor screens of digital equipment have been replaced by liquid crystal screens, and recently LED liquid crystals have become widespread, but liquid crystal monitors, especially LED liquid crystal monitors, strongly emit short-wavelength light called blue light. Therefore, in order to effectively reduce fatigue of the eyes and eyestrain caused by long-term use of digital equipment, measures should be taken to reduce the burden on the eyes caused by blue light. Generally, light in the wavelength range of 400 nm to 500 nm or light in the vicinity of this wavelength range is called blue light.

Regarding the above points, for example, Japanese Patent Application Publication No. 2013-8052 suggests an optical article having a multilayer film featuring selective reflection of light with a wavelength of 400 nm to 450 nm on a surface of a plastic substrate.

SUMMARY

As a means for reducing the burden on the eyes caused by blue light, in a spectacle lens, a multilayer film featuring selective reflection of blue light can be provided on a surface of a lens substrate, as described in Japanese Patent Application Publication No. 2013-8052.

When a multilayer film having the property of selectively reflecting blue light is provided on a surface of a lens substrate, it is indeed possible to decrease the quantity of blue light incident on the eyes of the spectacle wearer through the spectacle lens. However, the visual field of the spectacle wearer tends to become yellowish (hereinafter also simply referred to as "yellowness"). This is because the ratio of green light and red light relatively increases as blue light in the light of various wavelengths in the visible range is cut off, and thus, the yellowness of mixed color of red and green is easily visible.

An aspect of the present disclosure provides for a spectacle lens that can reduce a burden on the eyes caused by blue light and can reduce yellowness.

One aspect of the present disclosure relates to
a spectacle lens having
a lens substrate including a blue light absorbing compound, and
a multilayer film including a metal layer having a film thickness of 1.0 nm to 10.0 nm, wherein
a blue light cut ratio is 21.0% or more,
an average reflectance in a wavelength range of 400 nm to 500 nm measured on an object-side surface is 1.00% or less, and
an average reflectance in a wavelength range of 400 nm to 500 nm measured on an eyeball-side surface is 1.00% or less.

The spectacle lens includes a blue light absorbing compound in the lens substrate, and the blue light cut ratio thereof is 21.0% or more. Since the blue light can be blocked with such a high blue light cut ratio, the spectacle lens makes it possible to reduce the quantity of blue light entering the eyes of the wearer of the spectacles provided with this spectacle lens, thereby reducing the burden on the eyes of the wearer caused by light.

Furthermore, the spectacle lens has a multilayer film including a metal layer with a film thickness of 1.0 nm to 10.0 nm. Metals have the property of absorbing not only light in the wavelength range of blue light but also light in various wavelength ranges of visible range such as green light and red light. When blue light is selectively reflected and blocked with a multilayer film, the visual field of the spectacle wearer becomes yellowish, but by including a metal layer as one layer in the multilayer film, the yellowness can be reduced.

Further, when the metal layer is made thick, the transmittance (for example, luminous transmittance) of the spectacle lens is largely reduced, but in the case of the metal layer having a film thickness of 1.0 nm to 10.0 nm, the transmittance of the spectacle lens can be prevented from being greatly reduced.

Another aspect of the present disclosure relates to spectacles provided with the spectacle lens.

Advantageous Effects of Disclosure

According to the aspects of the present disclosure, it is possible to provide a less-yellowish spectacle lens that can reduce the burden on the eyes caused by blue light, and also to provide spectacles provided with the spectacle lens.

DESCRIPTION OF EMBODIMENTS

[Spectacle Lens]

A spectacle lens according to one aspect of the present disclosure has a lens substrate including a blue light absorbing compound, and a multilayer film including a metal layer having a film thickness of 1.0 nm to 10.0 nm, wherein a blue light cut ratio is 21.0% or more, an average reflectance in a wavelength range of 400 nm to 500 nm measured on an object-side surface is 1.00% or less, and an average reflectance in a wavelength range of 400 nm to 500 nm measured on an eyeball-side surface is 1.00% or less.

Definitions of terms and/or measurement methods of the present disclosure and in the present application will be described hereinbelow.

The "object-side surface" is a surface located on the object side when spectacles provided with spectacle lenses are worn by the wearer, and the "eyeball-side surface" is a surface located on the opposite side, that is, on the eyeball side when spectacles provided with spectacle lenses are worn by the wearer. Regarding the surface shape, in one embodiment, the object-side surface is convex and the eyeball-side surface is concave. However, the present disclosure is not limited to this embodiment.

The "blue light absorbing compound" refers to a compound having absorption in the wavelength range of 400 nm to 500 nm.

The "blue light cut ratio" is obtained on the basis of following Equation 1 according to the standard of the Japan Medical-Optical Equipment Industrial Association.

Blue light cut ratio $C_b = 1 - \tau_b$ (Equation 1)

In Equation 1, $\tau_b$ is a weighted transmittance of blue light harmful to eyes that is stipulated by the standard of the Japan Medical-Optical Equipment Industrial Association, and is calculated by following Equation 2. In Equation 2, WB(λ) is a weighting function and is calculated by following Equation 3. τ(λ) is the transmittance at the wavelength λ nm measured by a spectrophotometer. Therefore, the cut ratio of blue light by absorption and the cut ratio of blue light by reflection are added in the blue light cut ratio $C_b$.

$$\tau_b = \frac{\int_{380\,nm}^{500\,nm} \tau(\lambda) \cdot WB(\lambda) \cdot d\lambda}{\int_{380\,nm}^{500\,nm} WB(\lambda) \cdot d\lambda}$$ (Equation 2)

$$WB(\lambda) = E_{S\lambda}(\lambda) \cdot B(\lambda)$$ (Equation 3)

In Equation 3, $E_{s\lambda}(\lambda)$ is the spectral irradiance of sunlight, and B(λ) is a blue light hazard function. $E_{s\lambda}(\lambda)$, B(λ) and WB(λ) are described in Annex C of JIS T 7333. When values are calculated using $E_{s\lambda}(\lambda)$, B(λ) and WB(λ), the measurement with a spectrophotometer is performed at least from 380 nm to 500 nm at a measurement wavelength interval (pitch) of 1 nm to 5 nm.

The average reflectance in the wavelength range of 400 nm to 500 nm measured on the object-side surface of the spectacle lens is an average reflectance with respect to the light directly incident from the object side (that is, the incident angle is 0°) and is an arithmetic average of the reflectance measured on the object-side surface of the spectacle lens in the wavelength range of 400 nm to 500 nm by using a spectrophotometer. The average reflectance in the wavelength range of 400 nm to 500 nm measured on the eyeball-side surface of the spectacle lens is an average reflectance with respect to the light directly incident from the eyeball side and is an arithmetic average of the reflectance measured on the eyeball-side surface of the spectacle lens in the wavelength range of 400 nm to 500 nm by using a spectrophotometer. In the measurement, the measurement wavelength interval (pitch) can be arbitrarily set. For example, it can be set in the range of 1 nm to 5 nm. Hereinafter, the average reflectance in the wavelength range of 400 nm to 500 nm is also referred to as "blue light reflectance".

The "main wavelength" to be described hereinbelow is an index obtained by digitizing the wavelength of light color felt by the human eye and is measured in accordance with Annex JA of JIS Z 8781-3:2016.

The "luminous reflectance" to be described hereinbelow is measured in accordance with JIS T 7334:2011, and the "luminous transmittance" is measured in accordance with JIS T 7333:2005.

The "YI (Yellowness Index) value" to be described hereinbelow is measured in accordance with JIS K 7373:2006.

The YI value is a numerical value indicating yellow strength. The higher the YI value, the stronger the yellowish color.

In the present disclosure and the present description, "film thickness" is a physical film thickness. The film thickness can be obtained by a known film thickness measurement method. For example, the film thickness can be obtained by converting the optical film thickness measured by the optical film thickness measuring device into the physical film thickness.

Hereinafter, a multilayer film including a metal layer with a film thickness of 1.0 nm to 10.0 nm is also described as "a multilayer film including a metal layer", and another multilayer film is also described as "another multilayer film".

Hereinafter, the spectacle lens will be described in greater detail.

<Blue Light Cut Ratio>

The blue light cut ratio of the spectacle lens is 21.0% or more. With the spectacle lens having the blue light cut ratio of 21.0% or more, where the wearer wears spectacles provided with such a spectacle lens, the quantity of blue light entering the eyes of the wearer can be decreased and the burden on the eyes of the wearer caused by the blue light can be reduced. The blue light cut ratio may be 21.5% or more, 22.0% or more, 22.5% or more, 23.0% or more, 23.5% or more, or 24.0% or more. Further, the blue light cut ratio can be, for example, 50.0% or less, 40.0% or less, or 30.0% or less. However, from the viewpoint of reducing the quantity of blue light incident on the eyes of the wearer, a blue light cut ratio may be higher, so the upper limit exemplified above may be exceeded.

<Blue Light Reflectance>

As described above, when a multilayer film having the property of selectively reflecting blue light is provided on the surface of a lens substrate, the visual field of the spectacle wearer becomes yellowish. Meanwhile, the above-mentioned spectacle lens includes a blue light absorbing compound in the lens substrate and has a multilayer film including a metal layer, thereby making it possible to realize a blue light cut ratio of 21.0% or more without requiring an increase in the blue light reflectance on the spectacle lens surface. In the spectacle lens, the blue light reflectance measured on the object-side surface of the spectacle lens and the blue light reflectance measured on the eyeball-side surface of are each 1.00% or less. From the viewpoint of further reducing the yellowness, the blue light reflectance measured on the object-side surface of the spectacle lens may be less than 1.00%, 0.98% or less, 0.95% or less, 0.90% or less, 0.80% or less, or 0.70% or less. From the same viewpoint, the blue light reflectance measured on the eyeball-side surface of the spectacle lens may be less than 1.00%, 0.98% or less, 0.95% or less, 0.90% or less, 0.80% or less, or 0.70% or less. The blue light reflectance measured on the object-side surface of the spectacle lens and the blue light reflectance measured on the eyeball-side surface can be, for example, 0.10% or more, but may be lower than this.

The spectacle lens has a blue light cut ratio of 21.0% or more although the blue light reflectance on both surfaces is 1.00% or less and the blue light reflectance on the surface of the spectacle lens is low. This can be explained by the contribution of the lens substrate having a blue light absorbing compound, and the spectacle lens having a multilayer film including a metal layer as one layer in the multilayer film (multilayer film including a metal layer). The lens substrate and the multilayer film including a metal layer are described hereinbelow in detail.

<Lens Substrate>

The lens substrate included in the spectacle lens is not particularly limited as long as the substrate includes a blue light absorbing compound. The lens substrate can be a plastic lens substrate or a glass lens substrate. The glass lens substrate can be made, for example, of inorganic glass. A plastic lens substrate may be lightweight and hard to break and a blue light absorbing compound can be easily introduced therein. The plastic lens substrate can be exemplified by a styrene resin such as a (meth)acrylic resin, a polycarbonate resin, an allyl resin, an allyl carbonate resin such as diethylene glycol bis-allyl carbonate resin (CR-39), a vinyl resin, a polyester resin, a polyether resin, an urethane resin obtained by reacting an isocyanate compound with a hydroxy compound such as diethylene glycol, a thiourethane resin obtained by reacting an isocyanate compound with a polythiol compound, and a cured product (generally referred to as a transparent resin) obtained by curing a curable composition including a (thio)epoxy compound having one or more disulfide bonds in a molecule. The curable composition can also be referred to as a polymerizable composition. A not-dyed lens substrate (colorless lens) and a dyed substrate (dyed lens) may be used. The refractive index of the lens substrate can be, for example, about 1.60 to 1.75. However, the refractive index of the lens substrate is not limited to the above range, and may be separated upward and downward from the above range even within the above range. In the present disclosure and the present description, the refractive index refers to the refractive index for the light having a wavelength of 500 nm. In addition, the lens substrate may be a lens having refracting power (so-called prescription lens) or a lens without refracting power (so-called non-prescription lens).

The spectacle lens can be of a variety of types such as a single focus lens, a multifocal lens, a progressive power lens and the like. The type of the lens is determined by the surface shape of both sides of the lens substrate. Further, the lens substrate surface may be any one of a convex surface, a concave surface, and a flat surface. In ordinary lens substrates and spectacle lenses, the object-side surface is a convex surface and the eyeball-side surface is a concave surface. However, the present disclosure is not limited to such a configuration.

(Blue Light Absorbing Compound)

The lens substrate includes a blue light absorbing compound. This is one of the reasons why the blue light cut ratio of 21.0% or more can be provided to the spectacle lens. The blue light absorbing compound can be exemplified by various compounds having absorption in the wavelength range of blue light, such as a benzotriazole compound, a benzophenone compound, a triazine compound, an indole compound and the like, and a blue light absorbing compound can be exemplified by a benzotriazole compound and an indole compound, and a blue light absorbing compound can be exemplified by a benzotriazole compound. Benzotriazole compounds may be represented by a following formula (1).

(1)

In the formula (1), X represents a group giving a resonance effect. The substitution position of X may be the 5th position in the triazole ring.

Examples of X include a chlorine atom, a bromine atom, a fluorine atom, an iodine atom, a sulfo group, a carboxy group, a nitrile group, an alkoxy group, a hydroxy group, and an amino group.

In the formula (1), $R_2$ represents an alkyl group having 1 to 12 carbon atoms or an alkoxy group having 1 to 12 carbon atoms, and for the alkyl group and the alkoxy group, the number of carbon atoms may be 1 to 8, 2 to 8, or 4 to 8.

The alkyl group and alkoxy group may be branched or linear.

Examples of the alkyl group include a methyl group, an ethyl group, an n-propyl group, an iso-propyl group, an n-butyl group, a sec-butyl group, a tert-butyl group, a pentyl group, a hexyl group, a heptyl group, an n-octyl group, a 1,1,3,3-tetramethylbutyl group, a nonyl group, a decyl group, an undecyl group, a dodecyl group and the like.

Examples of the alkoxy group include a methoxy group, an ethoxy group, a propoxy group, a butoxy group, a pentyloxy group, a hexyloxy group, a heptyloxy group, an octyloxy group, a nonyloxy group, a decyloxy group, an undecyloxy group and a dodecyloxy group.

In the formula (1), the substitution position of $R_2$ may be 3rd, 4th or 5th position based on the substitution position of the benzotriazolyl group.

In the formula (1), $R_1$ represents an alkyl group having 1 to 3 carbon atoms or an alkoxy group having 1 to 3 carbon atoms, and specific examples thereof include those having the appropriate number of carbon atoms among the examples relating to $R_2$.

In the formula (1), m represents an integer of 0 or 1.

In the formula (1), the substitution position of $R_2$ may be the 5th position based on the substitution position of the benzotriazolyl group.

n represents the valence of $R_3$ and is 1 or 2.

In the formula (1), $R_3$ represents a hydrogen atom or a divalent hydrocarbon group having 1 to 8 carbon atoms. When n is 1, $R_3$ represents a hydrogen atom, and when n is 2, $R_3$ represents a divalent hydrocarbon group having 1 to 8 carbon atoms.

The hydrocarbon group represented by $R_3$ can be exemplified by an aliphatic hydrocarbon group or an aromatic hydrocarbon group. The number of carbon atoms of the hydrocarbon group represented by $R_3$ is 1 to 8, and may be 1 to 3.

Examples of the divalent hydrocarbon group represented by $R_3$ include a methanediyl group, an ethanediyl group, a propanediyl group, a benzenediyl group, a toluenediyl group and the like.

In the formula (1), the substitution position of $R_3$ may be the 3rd position based on the substitution position of the benzotriazolyl group.

$R_3$ may be a hydrogen atom; in this case, n is 1.

The benzotriazole compound may be a benzotriazole compound represented by a following formula (1-1).

(1-1)

In the formula (1-1), $R_1$, $R_2$ and m have the same meanings as defined above, and the exemplification and embodiments are also the same as those described above.

Specific examples of the benzotriazole compound represented by the formula (1) include methylenebis[3-(5-chloro-2-benzotriazolyl)-5-(1,1,3,3-tetramethylbutyl)-2-hydroxyphenyl], methylenebis[3-(5-chloro-2-benzotriazolyl)-5-(tert-butyl)-2-hydroxyphenyl], methylenebis[3-(5-chloro-2-benzotriazolyl)-5-tert-butyl-2-hydroxyphenyl], methylenebis[3-(5-chloro-2-benzotriazolyl)-5-tert-butyl-2-hydroxyphenyl], methylenebis[3-(5-chloro-2-benzotriazolyl)-5-ethoxy-2-hydroxyphenyl], phenylenebis[3-(5-chloro-2-benzotriazolyl-5-(1,1,3,3-tetramethylbutyl)-2-hydroxyphenyl], and the following specific examples of the benzotriazole compounds represented by the formula (1-1).

Specific examples of the benzotriazole compound represented by the formula (1-1) include 2-(3-tert-butyl-2-hydroxy-5-methylphenyl)-5-chloro-2H-benzotriazole, 2-(3-tert-butyl-2-hydroxy-5-ethylphenyl)-5-chloro-2H-benzotriazole, 5-chloro-2-(3,5-dimethyl-2-hydroxyphenyl)-2H-benzotriazole, 5-chloro-2-(3,5-diethyl-2-hydroxyphenyl)-2H-benzotriazole, 5-chloro-2-(2-hydroxy-4-methoxyphenyl)-2H-benzotriazole, 5-chloro-2-(4-ethoxy-2-hydroxyphenyl)-2H-benzotriazole, 2-(4-butoxy-2-hydroxyphenyl)-5-chloro-2H-benzotriazole, and 5-chloro-2-(2-hydroxy-4-octyloxyphenyl)-2H-benzotriazole.

Specific examples of the benzotriazole compound represented by the formula (1-1) include 2-(3-tert-butyl-2-hydroxy-5-methylphenyl)-5-chloro-2H-benzotriazole, 2-(3-tert-butyl-2-hydroxy-5-ethylphenyl)-5-chloro-2H-benzotriazole, 5-chloro-2-(4-ethoxy-2-hydroxyphenyl)-2H-benzotriazole, and 2-(4-butoxy-2-hydroxyphenyl)-5-chloro-2H-benzotriazole.

The above lens substrate may include 0.05 parts by mass to 3.00 parts by mass, may be 0.05 parts by mass to 2.50 parts by mass, 0.10 parts by mass to 2.00 parts by mass, or 0.30 parts by mass to 2.00 parts by mass of a blue light absorbing compound with respect to 100 parts by mass of a resin (or a polymerizable compound for obtaining the resin) constituting the lens substrate. However, the amount of the blue light absorbing compound is not limited to the above ranges, provided that the blue light cut ratio of the spectacle lens is 21.0% or more. A known method can be used for producing a lens substrate including a blue light absorbing compound. For example, in a method of curing a curable composition to obtain a lens substrate as a lens-shaped molded article, a lens substrate including a blue light absorbing compound can be obtained by adding the blue light absorbing compound to the curable composition. Alternatively, a blue light absorbing colorant can be introduced into a lens substrate by various wet or dry methods generally used for dyeing a lens substrate. For example, a wet method can be exemplified by a dipping method (immersion method), and a dry method can be exemplified by a sublimation dyeing method.

In addition, the lens substrate may include various additives which are generally included in lens substrates for spectacle lenses. For example, in the case where a lens substrate is formed by curing a curable composition including a polymerizable compound and a blue light absorbing compound, a polymerization catalyst disclosed in, for example, Japanese Patent Application Publication No. H07-063902, Japanese Patent Application Publication No. H07-104101, Japanese Patent Application Publication No. H09-208621 and Japanese Patent Application Publication No. H09-255781, and one or more additives such as an internal release agent, an antioxidant, a fluorescent whitening agent, a bluing agent and the like disclosed in, for example, Japanese Patent Application Publication No. H01-163012 and Japanese Patent Application Publication No. H03-281312 may be added to the curable composition. Known types and amounts of these additives can be used and a known method can be used for molding a lens substrate using a curable composition.

<Multilayer Film>
(Multilayer Film Including Metal Layer)

The spectacle lens has a multilayer film including a metal layer having a film thickness of 1.0 nm to 10.0 nm.

The multilayer film including a metal layer can be located on the object-side surface of the spectacle lens, can be located on the eyeball-side surface, or can be located on both surfaces. In one embodiment, the multilayer film including a metal layer is located on one of the eyeball-side surface and the object-side surface of the spectacle lens, and another multilayer film is located on the other surface. In another embodiment, a multilayer film including a metal layer is located on one of the eyeball-side surface and the object-side surface of the spectacle lens, and neither a multilayer film including a metal layer nor another multilayer film is located on the other surface. In one embodiment, from the viewpoint of the easiness of controlling the main wavelength measured on both surfaces of the spectacle lens described hereinbelow to within the range of 500.0 nm to 550.0 nm, the multilayer film including a metal layer may be located on at least the object side surface of the spectacle lens, or may be located only on the object-side surface. The multilayer film including a metal layer and the other multilayer film may be located directly on the surface of the lens substrate or may be located indirectly on the surface of the lens substrate with one or more other layers therebetween. Examples of the layer that can be formed between the lens substrate and the multilayer film include a polarizing layer, a light control layer, a hard coat layer, and the like. By providing the hard coat layer, the durability (strength) of the spectacle lens can be enhanced. The hard coat layer can be, for example, a cured layer obtained by curing a curable composition. For details of the hard coat layer, reference can be made to, for example, paragraphs 0025 to 0028 and 0030 of Japanese Patent Application Publication No. 2012-128135. In addition, a primer layer for improving adhesion may be formed between the lens substrate and the multilayer film. For details of the primer layer, reference can be made to, for example, paragraphs 0029 to 0030 of Japanese Patent Application Publication No. 2012-128135.

In the present disclosure and the present description, the "metal layer" means a film formed by depositing a component selected from the group consisting of a single metal element (pure metal), an alloy of a plurality of metal elements, and a compound of one or more metal elements (hereinafter referred to as "metal component") by an arbitrary film formation method, and it is a film composed of a metal component, except for depositing impurities inevitably mixed at the time of film formation and well-known additives that are used at random to assist film formation. For example, the metal layer is a film in which the metal component accounts for 90% by mass to 100% by mass with respect to the mass of the film, and may be a film in which the metal component accounts for 95% by mass to 100% by mass. The metal element can be exemplified by a transition element such as a chromium group element (for example, Cr, Mo, and W), an iron group element (for example, Fe, Co, and Ni), a noble metal element (for example, Cu, Ag, and Au). Specific embodiments of the metal layer include, for example, a chromium layer, a nickel layer and a silver layer.

The metal component contained in the chromium layer can be single chromium (that is, metallic Cr), chromium oxide, or a mixture thereof. The metal component contained in the nickel layer can be single nickel (that is, metallic Ni), nickel oxide, or a mixture thereof. The metal component contained in the silver layer can be single silver (that is, metallic Ag), silver oxide, or a mixture thereof. The metal component contained in the metal layer may be single metal element.

A known film formation method can be used for forming a multilayer film including a metal layer. From the viewpoint of easiness of film formation, film formation may be performed by vapor deposition. That is, the metal layer may be a vapor deposited film of a metal component. The vapor deposited film means a film formed by vapor deposition. In the present disclosure and the present description, "vapor deposition" is inclusive of a dry method such as a vacuum vapor deposition method, an ion plating method, a sputtering method, or the like. In the vacuum deposition method, an ion beam assist method in which an ion beam is simultaneously radiated during vapor deposition may be used. The same applies to the formation of a high refractive index layer and a low refractive index layer described below.

The metal layer included in the multilayer film including a metal layer has a film thickness of 1.0 nm to 10.0 nm. Hereinafter, the metal layer having a film thickness of 1.0 nm to 10.0 nm is also simply referred to as a metal layer. From the viewpoint of transmittance (for example, luminous transmittance) of the spectacle lens, the thickness of the metal layer may be 9.0 nm or less, 8.0 nm or less, 7.0 nm or less, 6.0 nm or less, 5.0 nm or less, 4.0 nm or less, or 3.0 nm or less. In addition, from the viewpoint of absorption efficiency of light with various wavelengths, such as blue light, by the metal layer, the thickness of the metal layer is 1.0 nm or more, and may be 1.1 nm or more. Only one metal layer with a film thickness of 1.0 nm to 10.0 nm may be included in the multilayer film including a metal layer, but in one embodiment, the metal layer may be divided into two or more layers and another layer may be present between the divided layers. In this case, the total film thickness of the metal layers divided into two or more layers is 1.0 nm to 10.0 nm.

The multilayer film including a metal layer may be a multilayer film in which a metal layer is included in a multilayer film in which a high refractive index layer and a low refractive index layer are alternately laminated. In the present disclosure and the present description, the terms "high" and "low" relating to "high refractive index" and "low refractive index" are relative expressions. That is, the high refractive index layer means a layer having a refractive index higher than that of the low refractive index layer included in the same multilayer film. In other words, the low refractive index layer is a layer having a refractive index lower than that of the high refractive index layer included in the same multilayer film. The refractive index of the high refractive index material constituting the high refractive index layer can be, for example, 1.60 or more (for example, a range of 1.60 to 2.40), and the refractive index of the low refractive index material constituting the low refractive index layer can be, for example, 1.59 or less (for example, a range of 1.37 to 1.59). However, as described above, since the expressions "high" and "low" relating to the high refractive index and the low refractive index are relative, the refractive indexes of the high refractive index material and the low refractive index material are not limited to the above ranges.

An inorganic material, an organic material or an organic/inorganic composite material can be used as the high refractive index material and the low refractive index material, and from the viewpoint of film forming properties. The multilayer film including a metal layer may be an inorganic multilayer film. More specifically, the high refractive index material for forming the high refractive index layer can be exemplified by one or a mixture of two or more of oxides selected from the group consisting of zirconium oxide (for example, $ZrO_2$), tantalum oxide ($Ta_2O_5$), titanium oxide (for example, $TiO_2$), aluminum oxide ($Al_2O_3$), yttrium oxide (for example, $Y_2O_3$), hafnium oxide (for example, $HfO_2$), and niobium oxide (for example, $Nb_2O_5$). Meanwhile, the low refractive index material for forming the low refractive index layer can be exemplified by one or a mixture of two or more of oxides or fluorides selected from the group consisting of silicon oxide (for example, $SiO_2$), magnesium fluoride (for example, $MgF_2$) and barium fluoride (for example, $BaF_2$). In the above example, oxides and fluorides are represented by stoichiometric compositions for convenience sake, but those having a deficient or excessive amount of oxygen or fluorine with respect to the stoichiometric composition also can be used as the high refractive index material or low refractive index material.

The high refractive index layer may be a film including a high refractive index material as a main component, and the low refractive index layer is a film including a low refractive index material as a main component. Here, the main component is a component which is present in the largest amount in the film, and is usually a component present in an amount of about 50% by mass to 100% by mass, and may be about 90% by mass to 100% by mass with respect to the mass of the film. Such a film (for example, a deposited film) can be formed by performing film formation using a film forming material (for example, a vapor deposition source) including the high refractive index material or the low refractive index material as the main component. The main component relating to the film forming material is also the same as described above. The film and the film-forming material sometimes include impurities inevitably admixed thereto, and also may include other components within ranges such that the function of the main component is not impaired, for example, other inorganic substances and well-known additional components playing the role of assisting film formation. Film formation can be performed by a known film formation method, and from the viewpoint of easiness of film formation, vapor deposition may be used.

The multilayer film including a metal layer can be, for example, a multilayer film in which a total of 3 to 10 of high refractive index layers and low refractive index layers are alternately laminated. The film thickness of the high refractive index layer and the film thickness of the low refractive index layer can be determined according to the layer configuration. Specifically, the combination of the layers to be included in the multilayer film and the film thickness of each layer can be determined by optical simulation by a known method based on the refractive indexes of the film forming materials for forming the high refractive index layer and the low refractive index layer and the desired reflection characteristic and transmission characteristic wished to be imparted to the spectacle lens by providing the multilayer film.

The layer configuration of the multilayer film including a metal layer can be exemplified by:
    a configuration in which a first layer (high refractive index layer)/a second layer (metal layer)/a third layer (low refractive index layer)/a fourth layer (high refractive index layer)/a fifth layer (low refractive index layer) are laminated in this order;

a configuration in which a first layer (low refractive index layer)/a second layer (high refractive index layer)/a third layer (low refractive index layer)/a fourth layer (high refractive index layer)/a fifth layer (metal layer)/a sixth layer (low refractive index layer)/a seventh layer (high refractive index layer)/an eighth layer (low refractive index layer) are laminated in this order; and a configuration in which a first layer (high refractive index layer)/a second layer (metal layer)/a third layer (high refractive index layer)/a fourth layer (low refractive index layer) are laminated in this order from the lens substrate side to the lens outermost surface side. In the above example of the layer configuration, the notation "/" is meant to be inclusive of the case in which the layer on the left and the layer on the right of "/" are adjacent to each other, and the case in which a conductive oxide layer described below is present between the layer on the left and the layer on the right of "/".

As an example of a combination of the low refractive index layer and the high refractive index layer contained in the multilayer film including a metal layer, a combination of a film including silicon oxide as a main component (low refractive index layer) and a film including zirconium oxide as a main component (high refractive index layer) can be mentioned. Further, a combination of a film including silicon oxide as a main component (low refractive index layer) and a film including niobium oxide as a main component (a high refractive index layer) can also be mentioned. A multilayer film including at least one laminated structure having two layers of the above combination adjacent to each other can be exemplified as an example of a multilayer film including a metal layer.

In addition to the metal layer, the high refractive index layer and the low refractive index layer described above, the multilayer film including a metal layer can also include a layer including a conductive oxide as a main component (conductive oxide layer), may also include one or more layers of a vapor-deposited film of a conductive oxide formed by vapor deposition using a vapor deposition source having the conductive oxide as a main component, at a random position in the multilayer film. This also applies to other multilayer films. The main component described with respect to the conductive oxide layer is also the same as described above.

From the viewpoint of transparency of the spectacle lens, an indium tin oxide (tin-doped indium oxide (ITO)) layer having a thickness of 10.0 nm or less, a tin oxide layer having a thickness of 10.0 nm or less, and a titanium oxide layer having a thickness of 10.0 nm or less may be included as the conductive oxide layer. The indium tin oxide (ITO) layer is a layer including ITO as a main component. This also applies to the tin oxide layer and the titanium oxide layer. By including the conductive oxide layer in the multilayer film including a metal layer and the other multilayer film, it is possible to prevent the spectacle lens from being electrically charged and also to prevent dust and dirt from adhering thereto. In the present disclosure and present description, an indium tin oxide (ITO) layer having a thickness of 10.0 nm or less, a tin oxide layer having a thickness of 10.0 nm or less, and a titanium oxide layer having a thickness of 10.0 nm or less are not considered as the "metal layer", "high refractive index layer" or "low refractive index layer" included in the multilayer film including a metal layer and another multilayer film. That is, even when one or more of these layers are contained in the multilayer film including a metal layer or another multilayer film, these layers shall not be considered as the "metal layer", "high refractive index layer" or "low refractive index layer". The thickness of the conductive oxide layer having a thickness of 10.0 nm or less can be, for example, 0.1 nm or more.

(Other Multilayer Film)

In the case where the spectacle lens has a multilayer film including a metal layer on one of the object-side surface and the eyeball-side surface and another multilayer film on the other surface, a multilayer film that is usually provided as an antireflection film on a spectacle lens may be formed as the other multilayer film. The antireflection film can be exemplified by a multilayer film exhibiting an antireflection effect against visible light (light in a wavelength range of 380 nm to 780 nm). A configuration of such a multilayer film has been known. The other multilayer film can be, for example, an inorganic multilayer film. For example, the other multilayer film can be exemplified by a multilayer film in which a total of three to ten layers of a high refractive index layer and a low refractive index layer are alternately laminated. Details of the high refractive index layer and the low refractive index layer are as described above. Further, as an example of a combination of the low refractive index layer and the high refractive index layer contained in another multilayer film, a combination of a film including silicon oxide as a main component (low refractive index layer) and a film including zirconium oxide as a main component (high refractive index layer) can be mentioned. Further, a combination of a film including a silicon oxide as a main component (low refractive index layer) and a film including a niobium oxide as a main component (high refractive index layer) can also be mentioned. A multilayer film including at least one laminated structure having two layers of the above combination adjacent to each other can be exemplified as an example of another multilayer film.

Further, another functional film can be formed on the multilayer film including a metal layer and/or another multilayer film. Such a functional film can be exemplified by various functional films such as a water repellent or hydrophilic antifouling film, an anti-fog film and the like. For these functional films, well-known techniques can be applied.

<Various Characteristics of Spectacle Lens>

(Luminous Transmittance)

In one embodiment, the spectacle lens can be a spectacle lens having high luminous transmittance and excellent transparency. The luminous transmittance of the spectacle lens is, for example, 35.0% or more, may be 40.0% or more, 45.0% or more, 50.0% or more, 55.0% or more, 60.0% or more, 65.0% or more, 70.0% or more, 75.0% or more, 80.0% or more, or 85.0% or more. Further, the luminous transmittance of the spectacle lens is, for example, 95.0% or less and can be 90.0% or less. By making the metal layer included in the multilayer film including a metal layer as a thin film (more specifically, a film thickness of 1.0 nm to 10.0 nm), it is possible to realize the above-described blue light cut ratio and to reduce yellowness without significantly lowering the luminous transmittance.

(Luminous Reflectance)

From the viewpoint of improving the appearance quality of the spectacle lens, the luminous reflectance measured on the object-side surface of the spectacle lens may be low. From the viewpoint of improving the wearing feeling of the spectacle lens, the luminous reflectance measured on the eyeball-side surface of the spectacle lens may be low. From the viewpoint of improving the appearance quality, the luminous reflectance measured on the object-side surface of the spectacle lens may be 1.80% or less, 1.50% or less, or 1.30% or less. Meanwhile, from the viewpoint of further improving the wearing feeling, the luminous reflectance measured on the eyeball-side surface of the spectacle lens may be 1.80% or less, 1.50% or less, or 1.30% or less.

The luminous reflectance measured on the object-side surface of the spectacle lens and the luminous reflectance measured on the eyeball-side surface of the spectacle lens each can be, for example, 0.10% or more, 0.20% or more, 0.30% or more, 0.40% or more, or 0.50% or more, but the lower limits presented hereinabove are exemplary and not limiting. The luminous reflectance can be realized by designing the multilayer film including a metal layer or other multilayer film provided on the object-side surface and/or the eyeball-side surface of the lens substrate. The film can be designed by optical simulation by a known method.

(YI Value)

Since the spectacle lens exhibits a blue light cut ratio of 21.0% or more, it is possible to reduce the quantity of blue light incident on the eyes of the spectacle wearer. However, since the blue light reflectance measured on both surfaces of the spectacle lens is 1.00% or less, it is possible to prevent the visual field of the spectacle wearer from becoming yellowish due to selective reflection of the blue light. The spectacle lens can exhibit a YI value of 10.0% or less. The YI value may be 9.0% or less, 8.0% or less, or 7.0% or less. Further, the YI value can be, for example, 2.0% or more or 3.0% or more, but YI value may be lower because the yellowness is reduced. Therefore, the above-exemplified lower limit may be exceeded.

(Main Wavelength)

Although a general spectacle lens has an antireflection film, the usual antireflection film is designed to exhibit a green interference color that makes it difficult for the human eye to feel discomfort. In such a spectacle lens, the main wavelength measured on the surface on the side having the antireflection film is usually the wavelength range of green light. Meanwhile, as described above, it has been conventionally suggested to provide a multilayer film having the property of selectively reflecting blue light on the surfaced of the spectacle lens substrate as a means for reducing the burden on the eyes caused by blue light. However, since the spectacle lens provided with such a multilayer film strongly reflects blue light on the surface on the side having this multilayer film, the main wavelength measured on this surface is usually in the wavelength range of blue light on the wavelength side shorter than the wavelength range of green light. Such a spectacle lens has a blue interference color that can be confirmed by observing the spectacle lens, and thus the appearance is different from that of a normal spectacle lens having an antireflective film exhibiting a green interference color. Regarding this difference in appearance, in recent years, there is a need for a spectacle lens having an appearance similar to that of a normal spectacle lens despite the fact that measures against blue light have been taken.

With this in view, the spectacle lens according to one embodiment of the present disclosure has a high blue light cut ratio but the blue light reflectance measured on both surfaces of the spectacle lens is as low as 1.00% or less. As a result, in one embodiment, the spectacle lens can have a main wavelength in the green wavelength range. Specifically, in the spectacle lens, at least one of the main wavelength measured on the object-side surface of the spectacle lens and the main wavelength measured on the eyeball-side surface of the spectacle lens can be in the range of 500.0 nm to 550.0 nm. Since the range of 500.0 nm to 550.0 nm is the wavelength range of green light, the spectacle lens having a main wavelength in the wavelength range of 500.0 nm to 550.0 nm on at least one surface can exhibit a green interference color, similarly to the usual lens, when observed from this surface side. Because the interference color on the object side greatly affects the appearance of the spectacle lens recognized by a third person facing the wearer wearing the spectacles, the main wavelength measured on at least the object-side surface may be 500.0 nm to 550.0 nm. Further, from the viewpoint of the appearance quality of the spectacle lens, the interference colors observed on both surfaces of the spectacle lens may be similar colors. Therefore, the main wavelength measured on both surfaces of the spectacle lens may be in the range of 500.0 nm to 550.0 nm. In one embodiment, the main wavelength measured on each surface of the spectacle lens can be, for example, 510.0 nm or more. In another embodiment, the main wavelength measured on each surface of the spectacle lens may be, for example, 540.0 nm or less.

Regarding the main wavelength, when comparing the case where the metal layer is located close to the lens substrate and the case where the metal layer is located far from the lens substrate, the main wavelength tends to be on the long wavelength side when the metal layer is located close to the lens substrate.

[Spectacles]

A further aspect of the present disclosure relates to spectacles including the spectacle lens according to one aspect of the present disclosure. Details of the spectacle lens included in the spectacles are as described above. By providing the spectacles with such a spectacle lens, it is possible to reduce the burden of blue light on the eyes of the spectacle wearer. Further, with the spectacle lens provided in the above-mentioned spectacles, it is possible to prevent the visual field of the spectacle wearer from becoming yellowish. There are no particular restrictions on the configuration of the spectacles such as a frame, and publicly known techniques can be used.

EXAMPLES

Hereinafter, the present disclosure will be further described with reference to examples. However, the present disclosure is not limited to the embodiments shown in the examples.

Example 1

(1) Preparation of Lens Substrate (Lens Substrate A) Including Blue Light Absorbing Compound A total of 100.00 parts by mass of bis-(β-epithiopropyl) sulfide and 0.40 parts by mass of 2-(3-tert-butyl-2-hydroxy-5-methylphenyl)-5-chloro-2H-benzotriazole are stirred and mixed, and then 0.05 parts by mass of tetra-n-butylphosphonium bromide as a catalyst was added thereto, followed by stirring and mixing under reduced pressure of 10 mmHg for 3 min to prepare a monomer composition for a lens (curable composition). Subsequently, the monomer composition for a lens was poured into a lens molding mold (0.00 D, wall thickness 2.0 mm) configured of a glass mold and a resin gasket prepared in advance, and polymerization was carried out in an electric furnace with a temperature inside the furnace of 20° C. to 100° C. over 20 h. After completion of the polymerization, the gasket and the mold were removed, and then heat treatment was performed at 110° C. for 1 h to obtain a plastic lens (lens substrate A). The obtained lens substrate A had a convex surface on the object side, a concave surface on the eyeball side, and a refractive index of 1.60.

(2) Deposition of Multilayer Film

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 1 (Table 1-1, Table 1-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 1 having a multilayer film including a metal layer (chromium (metallic Cr) layer) on the object side and another multilayer film (not including a metal layer) on the eyeball side was obtained.

In this Example, for both the convex side and the concave side, the multilayer vapor-deposited film was formed by lamination in the order of the first layer, the second layer, . . . from the lens substrate side (hard coat layer side) toward the front side of the spectacle lens, so that the outermost layer on the spectacle lens surface side was the layer indicated in the lowermost row in Table 1. In addition, in this Example, the film was formed by using evaporation sources (film formation materials) made of oxides shown in Table 1 or chromium (metallic Cr), except for impurities that could be unavoidably admixed. Therefore, the metal layer formed here is a chromium layer (metallic Cr layer). Table 1 shows the refractive index of each oxide and the film thickness of each layer. The same applies also to Examples and Comparative Examples which will be described later.

Example 2

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 2 (Table 2-1, Table 2-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 2 having a multilayer film including a metal layer (chromium (metallic Cr) layer) on the object side and another multilayer film (not including a metal layer) on the eyeball side was obtained.

Example 3

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 3 (Table 3-1, Table 3-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 3 having a multilayer film including a metal layer (chromium (metallic Cr) layer) on the object side and another multilayer film (not including a metal layer) on the eyeball side was obtained.

Example 4

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 4 (Table 4-1, Table 4-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 4 having a multilayer film including a metal layer (nickel (metallic Ni) layer) on the object side and another multilayer film (not including a metal layer) on the eyeball side was obtained.

Example 5

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 5 (Table 5-1, Table 5-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 5 having a multilayer film including a metal layer (chromium (metallic Cr) layer) on the object side and another multilayer film (not including a metal layer) on the eyeball side was obtained.

Example 6

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 6 (Table 6-1, Table 6-2) were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Example 6 having a multilayer film including a metal layer (chromium (metallic Cr) layer) on the object side and another multilayer film (not including a metal layer) on the eyeball side was obtained.

Comparative Example 1

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 8 were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Comparative Example 1 having other multilayer films (not including a metal layer) on the object side and the eyeball side was obtained.

Comparative Example 2

Both surfaces of the lens substrate A were optically processed (polished) to obtain optical surfaces, and then a hard coat layer (cured layer obtained by curing the curable composition) having a thickness of 3000 nm was formed on both surfaces.

Multilayer vapor-deposited films having the configurations shown in Table 9 were prepared by ion-assisted vapor deposition on the surface of the hard coat layer on the object side and on the surface of the hard coat layer on the eyeball side, respectively, by using oxygen gas and nitrogen gas as assist gases.

In this manner, the spectacle lens of Comparative Example 2 having other multilayer films (not including a metal layer) on the object side and the eyeball side was obtained.

The film thickness shown in Tables 1 to 9 is a value (unit: nm) obtained by converting the optical film thickness measured by the optical film thickness measuring device into a physical film thickness. The thickness of each layer was controlled by the deposition time.

TABLE 1-1

|  | Film forming material | Refractive index (500 nm) | Example 1 Object side |
|---|---|---|---|
| First layer | $SiO_2$ | 1.46 | 31.6 |
| Second layer | $ZrO_2$ | 2.09 | 7.2 |
| Third layer | $SiO_2$ | 1.46 | 157.7 |
| Fourth layer | $ZrO_2$ | 2.09 | 25.4 |
| Fifth layer | Cr |  | 1.2 |
| Sixth layer | $SiO_2$ | 1.46 | 22.5 |
| Seventh layer | $ZrO_2$ | 2.09 | 48.8 |
| Eighth layer | $SiO_2$ | 1.46 | 98.6 |

TABLE 1-2

|  | Film forming material | Refractive index (500 nm) | Example 1 Eyeball side |
|---|---|---|---|
| First layer | $SiO_2$ | 1.46 | 28.1 |
| Second layer | $ZrO_2$ | 2.09 | 6.2 |
| Third layer | $SiO_2$ | 1.46 | 173.3 |
| Fourth layer | $ZrO_2$ | 2.09 | 30.0 |

TABLE 1-2-continued

|  | Film forming material | Refractive index (500 nm) | Example 1 Eyeball side |
|---|---|---|---|
| Fifth layer | $SiO_2$ | 1.46 | 27.1 |
| Sixth layer | $ZrO_2$ | 2.09 | 49.1 |
| Seventh layer | $SiO_2$ | 1.46 | 95.6 |

TABLE 2-1

|  | Film forming material | Refractive index (500 nm) | Example 2 Object side |
|---|---|---|---|
| First layer | $ZrO_2$ | 2.09 | 30.9 |
| Second layer | Cr |  | 1.2 |
| Third layer | $SiO_2$ | 1.46 | 9.4 |
| Fourth layer | $ZrO_2$ | 2.09 | 76.3 |
| Fifth layer | $SiO_2$ | 1.46 | 90.5 |

TABLE 2-2

|  | Film forming material | Refractive index (500 nm) | Example 2 Eyeball side |
|---|---|---|---|
| First layer | $ZrO_2$ | 2.09 | 25.8 |
| Second layer | $SiO_2$ | 1.46 | 13.4 |
| Third layer | $ZrO_2$ | 2.09 | 88.5 |
| Fourth layer | $SiO_2$ | 1.46 | 85.6 |

TABLE 3-1

|  | Film forming material | Refractive index (500 nm) | Example 3 Object side |
|---|---|---|---|
| First layer | $ZrO_2$ | 2.09 | 30.9 |
| Second layer | $SiO_2$ | 1.46 | 9.4 |
| Third layer | $ZrO_2$ | 2.09 | 76.3 |
| Fourth layer | Cr |  | 1.2 |
| Fifth layer | $SiO_2$ | 1.46 | 90.5 |

TABLE 3-2

|  | Film forming material | Refractive index (500 nm) | Example 3 Eyeball side |
|---|---|---|---|
| First layer | $ZrO_2$ | 2.09 | 25.8 |
| Second layer | $SiO_2$ | 1.46 | 13.4 |

TABLE 3-2-continued

| | Film forming material | Refractive index (500 nm) | Example 3 Eyeball side |
|---|---|---|---|
| Third layer | ZrO$_2$ | 2.09 | 88.5 |
| Fourth layer | SiO$_2$ | 1.46 | 85.6 |

TABLE 4-1

| | Film forming material | Refractive index (500 nm) | Example 4 Object side |
|---|---|---|---|
| First layer | ZrO$_2$ | 2.09 | 28.2 |
| Second layer | Ni | | 1.2 |
| Third layer | SiO$_2$ | 1.46 | 5.7 |
| Fourth layer | ZrO$_2$ | 2.09 | 88.4 |
| Fifth layer | SiO$_2$ | 1.46 | 88.1 |

TABLE 4-2

| | Film forming material | Refractive index (500 nm) | Example 4 Eyeball side |
|---|---|---|---|
| First layer | ZrO$_2$ | 2.09 | 26.8 |
| Second layer | SiO$_2$ | 1.46 | 13.4 |
| Third layer | ZrO$_2$ | 2.09 | 86.5 |
| Fourth layer | SiO$_2$ | 1.46 | 85.6 |

TABLE 5-1

| | Film forming material | Refractive index (500 nm) | Example 5 Object side |
|---|---|---|---|
| First layer | ZrO$_2$ | 2.09 | 16.6 |
| Second layer | Cr | | 4.7 |
| Third layer | SiO$_2$ | 1.46 | 4.5 |
| Fourth layer | ZrO$_2$ | 2.09 | 168.5 |
| Fifth layer | SiO$_2$ | 1.46 | 89.4 |

TABLE 5-2

| | Film forming material | Refractive index (500 nm) | Example 5 Eyeball side |
|---|---|---|---|
| First layer | ZrO$_2$ | 2.09 | 26.8 |
| Second layer | SiO$_2$ | 1.46 | 13.4 |

TABLE 5-2-continued

| | Film forming material | Refractive index (500 nm) | Example 5 Eyeball side |
|---|---|---|---|
| Third layer | ZrO$_2$ | 2.09 | 86.5 |
| Fourth layer | SiO$_2$ | 1.46 | 85.6 |

TABLE 6-1

| | Film forming material | Refractive index (500 nm) | Example 6 Object side |
|---|---|---|---|
| First layer | ZrO$_2$ | 2.09 | 14.2 |
| Second layer | Cr | | 6.1 |
| Third layer | ZrO$_2$ | 2.09 | 173.6 |
| Fourth layer | SiO$_2$ | 1.46 | 89.4 |

TABLE 6-2

| | Film forming material | Refractive index (500 nm) | Example 6 Eyeball side |
|---|---|---|---|
| First layer | ZrO$_2$ | 2.09 | 26.8 |
| Second layer | SiO$_2$ | 1.46 | 13.4 |
| Third layer | ZrO$_2$ | 2.09 | 86.5 |
| Fourth layer | SiO$_2$ | 1.46 | 85.6 |

TABLE 7

| | Film forming material | Refractive index (500 nm) | Comparative Example 1 Object side | Comparative Example 1 Eyeball side |
|---|---|---|---|---|
| First layer | SiO$_2$ | 1.46 | 178.7 | 178.7 |
| Second layer | ZrO$_2$ | 2.09 | 18.5 | 18.5 |
| Third layer | SiO$_2$ | 1.46 | 30.9 | 30.9 |
| Fourth layer | ZrO$_2$ | 2.09 | 91.4 | 91.4 |
| Fifth layer | SiO$_2$ | 1.46 | 98.8 | 98.8 |

TABLE 8

| | Film forming material | Refractive index (500 nm) | Comparative Example 2 Object side | Comparative Example 2 Eyeball side |
|---|---|---|---|---|
| First layer | SiO$_2$ | 1.46 | 16.5 | 16.6 |
| Second layer | ZrO$_2$ | 2.09 | 5.8 | 5.8 |

TABLE 8-continued

|  | Film forming material | Refractive index (500 nm) | Comparative Example 2 | |
|---|---|---|---|---|
|  |  |  | Object side | Eyeball side |
| Third layer | SiO$_2$ | 1.46 | 174.9 | 178.4 |
| Fourth layer | ZrO$_2$ | 2.09 | 28.7 | 28.7 |
| Fifth layer | SiO$_2$ | 1.46 | 27.4 | 27.8 |
| Sixth layer | ZrO$_2$ | 2.09 | 48.2 | 48.6 |
| Seventh layer | SiO$_2$ | 1.46 | 92.7 | 93.9 |

[Evaluation Methods]

<1. Blue Light Cut Ratio and Luminous Transmittance of Spectacle Lens>

The direct incidence transmission spectral characteristics of each spectacle lens of Examples and Comparative Examples were measured with a spectrophotometer U4100 manufactured by Hitachi, Ltd. at a pitch of 1 nm from a wavelength of 380 nm to 780 nm by causing the light to fall from the surface side (convex side) on the object side of the spectacle lens on the optical center on the object-side surface.

Using the measurement results, the blue light cut ratio and luminous transmittance were determined by the methods described above.

<2. Blue Light Reflectance and Luminous Reflectance Measured on Object-Side Surface and Eyeball-Side Surface of Spectacle Lens>

The direct incidence reflection spectral characteristics at the optical center of the object-side surface (convex surface side) were measured from the object side of each spectacle lens of Examples and Comparative Examples.

Using the measurement results, the average reflectance (blue light reflectance) and luminous reflectance on the object-side surface in the wavelength range of 400 nm to 500 nm were determined by the methods described above.

Further, the direct incidence reflection spectral characteristics at the optical center of the eyeball-side surface (concave surface side) were measured from the eyeball side of each spectacle lens of Examples and Comparative Examples.

Using the measurement results, the average reflectance (blue light reflectance) and luminous reflectance on the eyeball-side surface in the wavelength range of 400 nm to 500 nm were determined by the method described above.

The above measurements were carried out using a lens reflectance measuring instrument USPM-RU manufactured by Olympus Corporation (measuring pitch: 1 nm).

Figure 1:
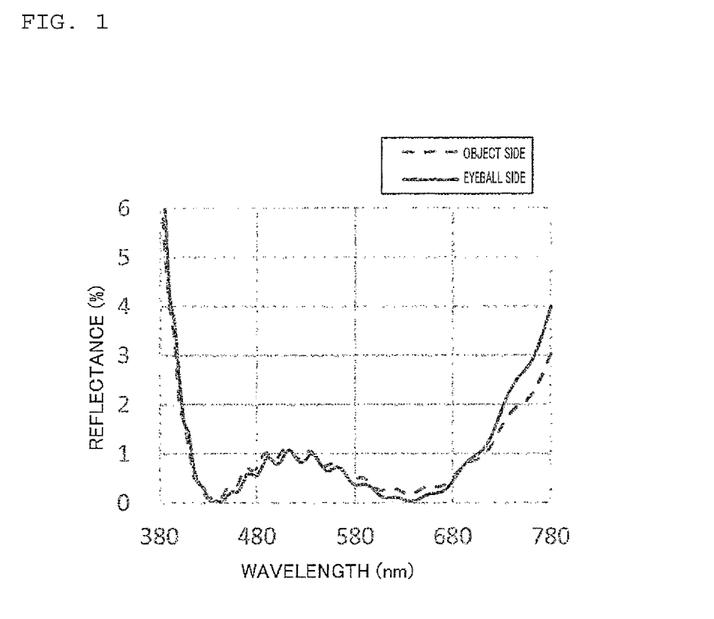
FIG. 1 is a reflection spectroscopic spectrum obtained for the spectacle lens of Example 1.
Figure 2:
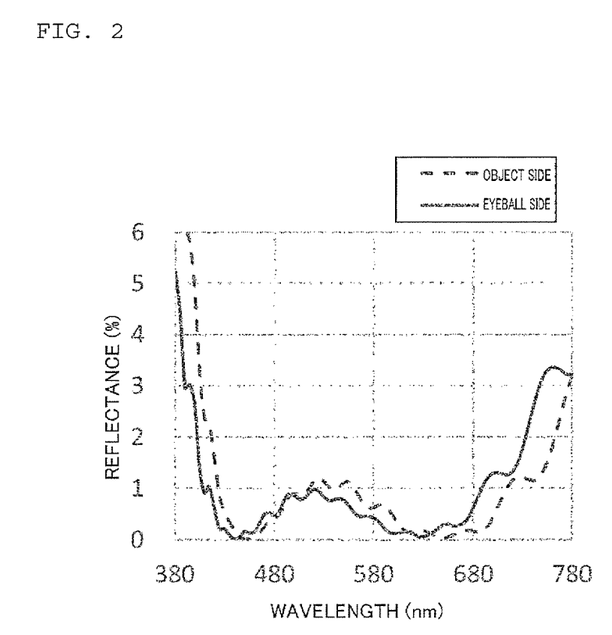
FIG. 2 is a reflection spectroscopic spectrum obtained for the spectacle lens of Example 2.

The reflection spectrum obtained for the spectacle lens of Example 1 is shown in FIG. 1, and the reflection spectrum obtained for the spectacle lens of Example 2 is shown in FIG. 2.

<3. Main Wavelength>

The main wavelength measured on the object-side surface of the spectacle lens was obtained according to Annex JA of JIS Z 8781-3:2016 by using the measurement result of the direct incident reflection spectroscopic characteristics obtained on the object-side surface of the spectacle lens in 2. hereinabove.

The main wavelength measured on the eyeball-side surface of the spectacle lens was obtained according to Annex JA of JIS Z 8781-3:2016 by using the measurement result of the direct incident reflection spectroscopic characteristics obtained on the eyeball-side surface of the spectacle lens in 2. hereinabove.

<4. YI Value>

Using the measurement result of the direct incidence transmission spectroscopic characteristics obtained in 1. hereinabove, the YI value was obtained according to JIS K 7373:2006. Specifically, X, Y, and Z were calculated from the transmission spectrum obtained by measurement of the direct incidence transmission spectroscopic characteristics according to the formula (3) of JIS Z 8701:1999, and the YI value for the D65 light source was calculated from the calculation formula in Section 6.1 of JIS K 7373:2006.

The above results are shown in Table 9.

TABLE 9

|  |  | Example 1 | Example 2 | Example 3 | Example 4 | Example 5 | Example 6 | Comparative Example 1 | Comparative Example 2 |
|---|---|---|---|---|---|---|---|---|---|
| Blue light absorbing compound on lens substrate | | Present | Present | Present | Present | Present | Present | Present | Present |
| Multilayer film including metal layer | | Present | Present | Present | Present | Present | Present | Absent | Absent |
| Blue light cut ratio | | 25.1% | 25.1% | 25.8% | 25.6% | 41.8% | 46.6% | 23.5% | 20.2% |
| Blue light reflectance | Object side | 0.65% | 0.97% | 0.56% | 0.66% | 0.72% | 0.94% | 3.59% | 0.35% |
|  | Eyeball side | 0.63% | 0.59% | 0.59% | 0.65% | 0.65% | 0.65% | 5.16% | 0.37% |
| Main wavelength | Object side | 523.3 nm | 533.2 nm | 481.3 nm | 531.7 nm | 530.2 nm | 534.3 nm | 468.3 nm | 541.1 nm |
|  | Eyeball side | 520.6 nm | 518.4 nm | 518.4 nm | 522.2 nm | 522.2 nm | 522.2 nm | 467.9 nm | 546.2 nm |
| Luminous reflectance | Object side | 0.69% | 0.76% | 0.20% | 0.66% | 0.68% | 1.19% | 0.52% | 0.59% |
|  | Eyeball side | 0.60% | 0.54% | 0.54% | 0.64% | 0.64% | 0.64% | 0.75% | 0.56% |
| Luminous transmittance | | 88.8% | 88.2% | 86.1% | 86.0% | 67.7% | 62.0% | 94.4% | 93.0% |
| YI value | | 6.6% | 6.2% | 5.0% | 3.8% | 5.9% | 6.2% | 10.4% | 4.8% |

In Table 9, the spectacle lens measured at both surfaces of the spectacle lens of Comparative Example 1 exceeds 1.00%. Thus, the spectacle lens of Comparative Example 1 exhibits a high blue light reflectance on both surfaces, and thus exhibits a blue light cut ratio higher than that of the spectacle lens of Comparative Example 2, but the YI value thereof is higher than those of the spectacle lenses of Examples 1 to 6. Therefore, when the spectacles provided with the spectacle lens of Comparative Example 1 are worn, the visual field of the wearer will be yellowish as compared with the case where the spectacles provided with the spectacle lenses of Examples 1 to 6 are worn.

Meanwhile, according to the results shown in Table 6, the spectacle lenses of Examples 1 to 6 show a high blue light cut ratio of 21.0% or more, and it can be confirmed that the YI value thereof is low and the yellowness visually recognized by the spectacles wearer is reduced as compared with those of the spectacle lens of Comparative Example 1.

Finally, the above-described embodiments are summarized.

According to one aspect, there is provided a spectacle lens having a lens substrate including a blue light absorbing compound, and a multilayer film including a metal layer having a film thickness of 1.0 nm to 10.0 nm, wherein a blue light cut ratio is 21.0% or more, an average reflectance in a wavelength range of 400 nm to 500 nm measured on an object-side surface is 1.00% or less, and an average reflectance in a wavelength range of 400 nm to 500 nm measured on an eyeball-side surface is 1.00% or less.

The spectacle lens can reduce the burden on the eyes caused by blue light and can reduce yellowness.

In one embodiment, a main wavelength measured on the object-side surface of the spectacle lens is in a range of 500.0 nm to 550.0 nm.

In one embodiment, a main wavelength measured on the eyeball-side surface of the spectacle lens is in a range of 500.0 nm to 550.0 nm.

In one embodiment, the main wavelength measured on the object-side surface of the spectacle lens and the main wavelength measured on the eyeball-side surface of the spectacle lens are each in a range of 500.0 nm to 550.0 nm.

In one embodiment, in the spectacle lens, a multilayer film is located on the object-side surface and the eyeball-side surface of the lens substrate, and the multilayer film including a metal layer is a multilayer film located on the object-side surface of the lens substrate.

In one embodiment, the metal layer is a chromium layer.

In one embodiment, the metal layer is a nickel layer.

In one embodiment, the luminous transmittance of the spectacle lens is 80.0% or more.

In one embodiment, the YI value of the spectacle lens is 10.0% or less.

According to another aspect, there is provided a pair of spectacles including the spectacle lens.

Two or more of the various embodiments disclosed in this description can be arbitrarily combined.

It should be considered that the embodiments disclosed hereinabove are exemplary in all respects and are not restrictive. The scope of the present disclosure is defined not by the description above but by the claims, and is intended to be inclusive of all modifications that do not depart from the scope and meaning of the claims.

The present disclosure can be used in the field of manufacturing spectacle lenses and spectacles.

What is claimed is:

1. A spectacle lens, comprising:
   a lens substrate including a blue light absorbing compound, and
   a multilayer film including a metal layer having a film thickness of 1.0 nm to 10.0 nm, wherein
   a blue light cut ratio is 21.0% or more,
   an average reflectance in a wavelength range of 400 nm to 500 nm measured on an object-side surface is 1.00% or less, and
   an average reflectance in a wavelength range of 400 nm to 500 nm measured on an eyeball-side surface is 1.00% or less.

2. The spectacle lens according to claim 1, wherein a main wavelength measured on the object-side surface of the spectacle lens is in a range of 500.0 nm to 550.0 nm.

3. The spectacle lens according to claim 1, wherein a main wavelength measured on the eyeball-side surface of the spectacle lens is in a range of 500.0 nm to 550.0 nm.

4. The spectacle lens according to claim 1, wherein
   multilayer films are located on the object-side surface and the eyeball-side surface of the lens substrate, and
   the multilayer film including a metal layer is a multilayer film located on the object-side surface of the lens substrate.

5. The spectacle lens according to claim 1, wherein the metal layer is a chromium layer.

6. The spectacle lens according to claim 1, wherein the metal layer is a nickel layer.

7. The spectacle lens according to claim 1, wherein a luminous transmittance is 80.0% or more.

8. A pair of spectacles comprising the spectacle lens according to claim 1.

* * * * *